(12) United States Patent
Nagahara

(10) Patent No.: US 6,931,415 B2
(45) Date of Patent: Aug. 16, 2005

(54) TEXT INFORMATION BROWSING AID APPARATUS, DIGITAL CONTENT CREATION SYSTEM, DIGITAL CONTENT DISTRIBUTION SYSTEM, AND STORAGE MEDIUM

(75) Inventor: Atsushi Nagahara, Chino (JP)

(73) Assignee: Seiko Epson Corporation, Tokyo (JP)

(*) Notice: Subject to any disclaimer, the term of this patent is extended or adjusted under 35 U.S.C. 154(b) by 498 days.

(21) Appl. No.: 09/945,829

(22) Filed: Sep. 5, 2001

(65) Prior Publication Data

US 2002/0042790 A1 Apr. 11, 2002

(30) Foreign Application Priority Data

Sep. 6, 2000 (JP) ........................................ 2000-270433

(51) Int. Cl.⁷ .............................................. G06F 17/30
(52) U.S. Cl. ............................... 707/102; 707/2; 707/3; 707/4; 707/5; 707/10
(58) Field of Search ................................ 707/2, 3, 4, 5, 707/102, 10; 705/1, 14; 709/217; 715/776; 713/156; 345/581; 235/380, 381; 380/279

(56) References Cited

U.S. PATENT DOCUMENTS

| | | | | |
|---|---|---|---|---|
| 5,926,624 A | * | 7/1999 | Katz et al. ................. | 709/217 |
| 5,991,399 A | * | 11/1999 | Graunke et al. ............ | 380/279 |
| 6,263,313 B1 | * | 7/2001 | Milsted et al. .................. | 705/1 |
| 6,331,865 B1 | * | 12/2001 | Sachs et al. ................. | 715/776 |
| 6,338,044 B1 | * | 1/2002 | Cook et al. ................... | 705/14 |
| 6,343,738 B1 | * | 2/2002 | Ogilvie ........................ | 235/381 |
| 6,434,561 B1 | * | 8/2002 | Durst et al. ................... | 707/10 |
| 6,547,134 B2 | * | 4/2003 | Ogilvie ........................ | 235/380 |
| 6,825,849 B1 | * | 11/2004 | Minakuchi et al. ......... | 345/581 |
| 6,829,708 B1 | * | 12/2004 | Peinado et al. ............. | 713/156 |

FOREIGN PATENT DOCUMENTS

| | | |
|---|---|---|
| JP | A-63-80319 | 4/1988 |
| JP | A-5-334350 | 12/1993 |
| JP | A-7-121539 | 5/1995 |
| JP | A-7-200701 | 8/1995 |
| JP | A-62-86385 | 4/1997 |

* cited by examiner

Primary Examiner—Frantz Coby
(74) Attorney, Agent, or Firm—Oliff & Berridge, PLC

(57) ABSTRACT

A digital content distribution system that is suitable to provide digital content readable and output the digital content in a layout viewable for the user is provided. A content distribution terminal includes a user information registration DB that stores user information, and a dictionary information DB that stores dictionary information. The content distribution terminal selects dictionary information from the dictionary information registration DB based on the user information in the user information registration DB and the content of digital content associated with the user information, and adds the selected dictionary information to the digital content. Accordingly, the user can obtain digital content including only dictionary information of a relatively high necessity.

6 Claims, 10 Drawing Sheets

300 USER PROFILE TABLE

| USER ID 302 | DESTINATION ADDRESS 304 | CATEGORY NO. 306 | KEYWORD 308 | DISTRIBUTION DATE 310 | DISTRIBUTION TIME 312 | LAYOUT NO. 314 | MAXIMUM NO. OF PAGES 316 | FONT SIZE 318 |
|---|---|---|---|---|---|---|---|---|
| Andy | Andy@aaa.com | 1700 | PROCESSOR | EVERY DAY | 5 | 2 | 2 | SMALL |
| Bill | Bill@bbb.com | 1501 | OS | WEEKDAYS | 11 | 5 | 2 | SMALL |
| Candy | Candy@ccc.com | 201* | APPLICATION | WEEKEND | 9 | 6 | u | REGULAR |

| FIELDS OF INTEREST 319 | LINGUISTIC LEVEL 320 | EXPERTISE LEVEL 322 | LANGUAGES DESIRED TO BE TRANSLATED 324 |
|---|---|---|---|
| COMPUTER SPORTS | 720 | COMPUTER: A RANK SPORTS: BEGINNER | ENGLISH |
| SECURITIES | 420 | SECURITIES: A RANK | ENGLISH FRENCH |
| MEDICINE | 700 | MEDICINE: B RANK | CHINESE |

330 LAYOUT NO. ASSOCIATION TABLE

| LAYOUT NO. | LAYOUT DEFINITION FILE NAME |
|---|---|
| 1 | form01 |
| 2 | form02 |
| 3 | form03 |
| 4 | form04 |
| 5 | form05 |
| 6 | form06 |

(a)

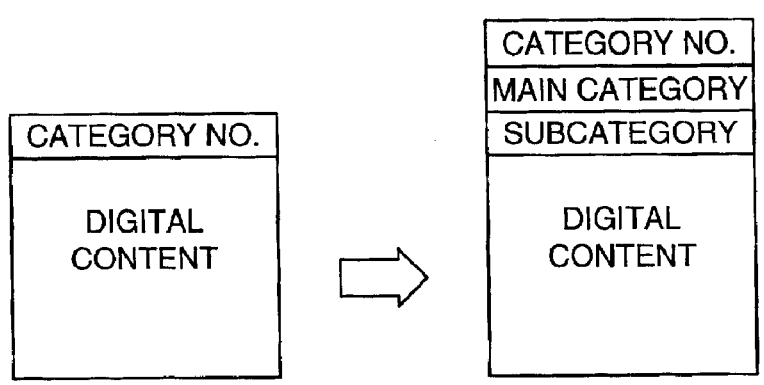

(b)

340 CATEGORY NO. ASSOCIATION TABLE

| CATEGORY NO. | MAIN CATEGORY | SUBCATEGORY |
|---|---|---|
| 1102 | WORLD NEWS | AMERICA |
| 1135 | REGION | TOKYO |
| 1122 | POLITICS | ELECTION |
| 1202 | WEATHER | WORLD TEMPERATURE |
| 1310 | BUSINESS | GENERAL FINANCE |
| 2010 | SPORTS | BASEBALL |
| 2020 | SPORTS | FOOTBALL |
| 2030 | SPORTS | BASKETBALL |
| 2040 | SPORTS | HOCKEY |
| 2050 | SPORTS | SOCCER |
| 2070 | SPORTS | GOLF |
| 3000 | SPORTS | TENNIS |
| 1121 | HOBBY | HISTORY |
| 1500 | HEALTH | PREVENTION |
| 1401 | ENTERTAINMENT | TELEVISION |
| 1432 | TRAVEL | SIGHTSEEING |
| 1501 | SCIENCE & TECHNOLOGY | COMPUTER |

FIG. 5

360 ENGLISH-JAPANESE DICTIONARY REGISTRATION TABLE

| ENGLISH WORD | TRANSLATION | LINGUISTIC LEVEL | EXPERTISE LEVEL |
|---|---|---|---|
| company | KAISHA, SHOUSHA, SHOUKAI | 400 | GENERAL |
| candescence | HAKUNETSU | 650 | MEDICINE: C RANK |
| CAD | KONPYUTA ENYOU SEKKEI SHISUTEMU | 750 | COMPUTER: C RANK |
| CAD | KANDOUMYAKU SHIKKAN | 750 | MEDICINE: B RANK |

Step1
INPUT OF USER ID, ETC.

DESTINATION ADDRESS    USER ID
530                    531

PASSWORD
532
                                         526  OK

FIG. 9

Step2

SPECIFICATION OF CATEGORIES

520 — First Choice ▼         DISTRIBUTION DATE
521 — Second Choice ▼        540 ○ EVERY DAY
522 — Third Choice ▼         541 ○ EVERY WEEK
523 — Fourth Choice ▼        542 ○ WEEKDAYS
                                   (FROM MONDAY THROUGH FRIDAY)
524 — Fifth Choice ▼         543 ○ WEEKEND
525 — Sixth Choice ▼               (SATURDAY AND SUNDAY)

DISTRIBUTION TIME
                             550 — Select Timezone ▼
                             551 — Select Time of Day ▼

CATEGORY      EDIT

First Choice
      SPORTS; GOLF; MARUYAMA

Second Choice
      AMERICA; AMERICAN TOP NEWS; BUSH

DISTRIBUTION DATE AND TIME      EDIT
    EVERY DAY
    5:00 AM

DESTINATION ADDRESS
    aaaa@bbb.com

DESIGN TYPE      EDIT

MAXIMUM NO. OF PAGES
    4 PAGES

FONT SIZE
    SMALL

590 — [DISTRIBUTION START]

TEXT INFORMATION BROWSING AID APPARATUS, DIGITAL CONTENT CREATION SYSTEM, DIGITAL CONTENT DISTRIBUTION SYSTEM, AND STORAGE MEDIUM

BACKGROUND OF THE INVENTION

1. Field of Invention

The present invention relates to a system for distributing digital content and storage medium. More particularly, the invention relates to a text information browsing aid system, a digital content creation system, a digital content distribution system, and a storage medium which are suitable to provide the user with readable digital content.

2. Description of Related Art

Related art apparatuses aid browsing of text information by adding translated text or translation of particular words in association with original text information, for example, in English.

Examples of such apparatuses include a foreign language publication with display of interpretation, disclosed in Japanese Unexamined Patent Application Publication No. 62-86385 (hereinafter referred to as a "first conventional example"), a printing apparatus disclosed in Japanese Unexamined Patent Application Publication No. 63-80319 (hereinafter referred to as a "second conventional art"), a machine translation apparatus disclosed in Japanese Unexamined Patent Application Publication No. 5-334350 (hereinafter referred to as a "third conventional art"), and a machine translation apparatus disclosed in Japanese Unexamined Patent Application Publication No. 7-121539 (hereinafter referred to as a "fourth conventional art").

The first conventional art is print paper on which, in addition to a multicolumned foreign language text, interpretations, including translation of words and phrases in the foreign language text, and symbols, indicating the structure of sentences, are displayed between the lines. This facilitates interpretation compared with a case where translations, comments, and expositions regarding the foreign language text are all provided in the front or back section.

The second conventional art is a printing apparatus for printing a plurality of articles in a pair, which includes a determination device for determining the vertical width of a pair of articles being printed; a print position prediction device for predicting the print position of the articles by the printer based on the result of the determination by the determination device and the current print position; and a new page operation instruction device for instructing a new page operation based on the result of the prediction by the print position prediction device and the maximum print position. This clarifies the association between the pair of articles.

The third conventional art includes process S2 for obtaining and storing the layout information of an input original text, process S3 for translating the original text into another language, and process S4 for reformatting the translation result in accordance with the stored layout information. Thus, the translated text is automatically output in a format which readily allows confirmation of the correspondence between the translated text and the original text.

The forth conventional example includes, in addition to a conventional machine translation apparatus, a layout structure storage device, a word specification device, a character drawing device, and a font data storage device, so that translation is drawn in an image data storage device by using the character drawing device and the translation is output between the lines of image data of the original text on a display device. Alternatively, an arbitrary word is specified by using the word specification device, and then translation is drawn in the image data storage device by using the character drawing device and output at a position associated with the word between the lines of image data of the original text on display device. Thus, the output result includes figures, tables, and English text which appear in the original document, enhancing the readability of the result of translation by the machine translation apparatus and facilitating understanding of the translated document.

Furthermore, an example of a conventional system for providing digital content, such as news, is a personal electronic newspaper system disclosed in Japanese Unexanined Patent Application Publication No. 4-192751 (hereinafter referred to as a "fifth conventional example"). In addition, an example of technique related to providing digital content is a mail order catalog creation system disclosed in Japanese Unexamined Patent Application Publication No. 7-200701 (hereinafter referred to as a "sixth conventional example").

The fifth conventional example is an electronic newspaper system which receives article information transmitted from an article information database storing article information regarding newspaper articles, and which then reconstructs the article information for display on the screen. The electronic newspaper system includes an information storage unit for storing interest and knowledge of a plurality of users as a plurality of personal newspaper composing information; a learning unit for learning personal newspaper composing information from the searching history of the user; a screen operation unit for operating the screen in order to obtain personal newspaper composing information and for obtaining article information in accordance with the user based on the personal newspaper composing information from the database and reconstructing the article information for display; and a control unit for controlling the information storage unit, the learning unit, and the screen operation unit.

This readily allows the user to obtain article information in accordance with personal interest and knowledge, and thus more detailed article information can be provided.

In the sixth conventional example, a product information file including product information to be shown on catalogs of the products (image or description of the products), a customer information file including personal information regarding particular properties of each customer, and a product condition file in which conditions matching each of the properties of the personal information are set for each of the products, are prepared. A product list extraction unit compares the personal information in the customer information file with the conditions in the product condition file, extracting only those products which match the conditions for each individual customer. A layout processing unit reads and lays out product information for the extracted products. A color electronic printer outputs on paper the product information which has been laid out, and the paper is bound into a booklet by a processing and binding machine, and sent to the customer as a catalog.

This allows creation of customer-specific catalogs on which only products suitable for each individual customer are listed.

The first to fourth conventional examples, however, output the same result for the same original text with no regard to the user. Thus, for example, even translated text or translated word, which the user is already familiar with and is not of importance, might be added to the original text.

That is, some users wish, instead of the entire original text being translated, only translations of articles or words necessary in accordance with the user's knowledge level to be added, from the perspective of reducing the amount of the entire text and enhancing readability.

This is not limited to addition of translation to original text, and the same applies, for example, to a case where information which aids browsing of text information such as comments and expositions is automatically added to the text information.

Article information distributed by a digital content distribution system has hitherto typically been composed mostly of text information, such as article information which is distributed in an electronic mail format. This has been the case because a large volume of data cannot be transmitted in an effective time period due to slow network transmission rates, for instance. Thus, in most cases, the article information which is distributed has only needed browsing on the screen, and there has been little need for printing. Even when the article information is printed, it suffices if the text information can be read, and thus there has been little need for considering the layout. However, with the recent enhancements in network transmission rate, it will be possible to distribute image information as well as text information in the future. In that case, browsing on the screen has the shortcoming in that it does not readily allow understanding of the overall article information. Thus, it is assumed that many users will wish to print the article information which has been distributed and browse the article information on paper.

In the fifth conventional example, the article information will be actually browsed by using a WWW browser; however, when the article information displayed on the screen with the WWW browser is printed, a piece of article information might not be contained in a sheet of paper and might be printed over a plurality of sheets of paper, considerably degrading the viewability of the print result. In particular, when an image and text information are combined to form a piece of article information, the image and the text information might be printed on separate sheets of paper. This hinders the user's understanding of the association of the text information and the image. As a result, the user may be prevented from understanding the overall article information and even the content of individual article information.

When the sixth conventional example is applied to a digital content distribution system, the problems previously described are solved to a certain degree by reading and laying out product information of extracted products. However, the output layout of a catalog is determined by the distributor of the catalog, and the catalog is printed in a predetermined output layout presumably viewable for the user. Thus, the catalog is viewable on average, but is not necessarily viewable for every user. That is, some users may feel larger font of text information enhances viewability, while other users may feel a smaller area for text information and a larger area for image enhances viewability.

SUMMARY OF THE INVENTION

The present invention addresses the unsolved problems pertinent to the related art as discussed above, and an object thereof is to provide a text information browsing aid system which is suitable to provide the user with readable text information. Another object thereof is to provide a digital content creation system, a digital content distribution system, and a storage medium which are suitable to provide the user with readable digital content and to output the digital content in a viewable layout for the user.

In order to achieve the above objects, a text information browsing aid system according a first aspect of the present invention is an apparatus that aids browsing of text information, including: a user information storage device that stores user information regarding a user; and a text information processing device that processes the text information based on the user information in the user information storage device. Based on the user information in the user information storage device and the content of the text information associated with the user information, the text information processing device processes text information into a form which presumably most suitably aids browsing of the text information by the user associated with the user information.

In accordance with the arrangement, based on the user information in the user information storage device and the text information associated with the user information, the text information processing device processes text information into a form which presumably most suitably aids browsing of the text information by the user associated with the user information.

Any arrangement of the text information processing device can be used as long as it processes the text information into a form which presumably most suitably aids browsing of the text information by the user associated with the user information based on the user information. For example, it may add dictionary information in accordance with the user's knowledge level to the text information based on the user information, or it may display subjects in red and verbs in green in articles included in the original text in accordance with the user's knowledge level based on the user information.

The user information storage device stores the user information by any device/method and at any time, and it may store the user information in advance. Or, the user information storage device may be enabled by an external input to store the user information when the system is in operation, instead of storing the user information in advance. Hereinafter, the same applies to a digital content creation system according to a third aspect of the invention, and a digital content distribution system according to a ninth aspect of the invention.

The system may be implemented in the form of a single apparatus, or may be implemented as a network system in which a plurality of terminals are communicatively connected. In the latter case, each of the components may belong to any of the plurality of terminals as long as the components are communicatively connected to each other. Hereinafter, the same applies to the digital content creation system according to the third aspect of the invention and the digital content distribution system according to the ninth aspect of the invention.

Furthermore, a text information browsing aid apparatus according to a second aspect of the present invention is a text information browsing aid system according to the first aspect, wherein based on the user information in the user information storage device and the content of the text information associated with the user information, the text information processing device associates browsing aid information which aids browsing of the text information with the text information.

In accordance with the arrangement, based on the user information in the user information storage device and the content of the text information associated with the user information, the text information processing device associates browsing aid information which aids browsing of the text information with the text information.

The browsing aid information is information that aids browsing of text information, and includes, for example, information regarding translation, comments, and expositions for text included in the text information.

As long as the browsing aid information is associated with the text information, the association may be made, for example, by adding the browsing aid information to the text information or adding reference information which allows the browsing aid information to be obtained (e.g., URL (Uniform Resource Locator)) to the text information.

Furthermore, in order to achieve the above objects, a digital content creation system according to a third aspect of the present invention is a system that creates digital content, including: a user information storage device that stores user information regarding a user; a dictionary information storage device that stores dictionary information; a dictionary information selection device that selects the dictionary information from the dictionary information storage device based on the user information in the user information storage device and the content of digital content associated with the user information; and a dictionary information association device that associates the dictionary information selected by the dictionary information selection device with the digital content.

In accordance with the arrangement, a dictionary information selection device selects dictionary information from the dictionary information storage device based on the user information in the user information storage device and the content of digital content associated with the user information, and the dictionary information association device associates the selected dictionary information with the digital content.

As long as the dictionary information is associated with the digital content, the association may be made, for example, by adding the dictionary information to the digital content or by adding reference information which allows the dictionary information to be obtained (e.g., URL) to the digital content. Hereinafter, the same applies to the digital content distribution system according to the ninth aspect.

The dictionary information association device may directly add the dictionary information selected by the dictionary information selection device to the digital content. From the perspective of enhancing readability, however, it is preferable that character decoration be added to emphasize the dictionary information selected by the dictionary information selection device. Hereinafter, the same applies to the digital content distribution system according to the ninth aspect.

The digital content with which the dictionary information has been associated may be distributed to the user, or may be stored in a storage device for access and retrieval from a client terminal by the user.

Furthermore, a digital content creation system according to a fourth aspect of the present invention is a digital content creation system according to the third aspect, wherein the user information includes interest information regarding the interest or preference of the user, and the dictionary information selection device selects dictionary information which matches the interest or preference of the user from the dictionary information storage device based on the interest information in the user information storage device.

In accordance with the arrangement, the dictionary information selection device selects dictionary information that matches the interest or preference of the user from the dictionary information storage device based on the interest information in the user information storage device.

Furthermore, a digital content creation system according to a fifth aspect of the present invention is a digital content creation system according to one of the third and fourth aspects, wherein the dictionary information selection means selects dictionary information related to words or sentences included in the digital content from the dictionary information storage device based on the user information in the user information storage device.

In accordance with the arrangement, the dictionary information selection device selects dictionary information related to words or sentences included in the digital content from the dictionary information storage device based on the user information in the user information storage device.

Furthermore, a digital content creation system according to a sixth aspect of the present invention is a digital content creation system according to one of the third to fifth aspects, including a content translation device that translates text information included in the digital content, wherein when a plurality of translations exists as candidates for the same word in the result of translation by the content translation device, the dictionary information selection device determines a presumably most suitable translation from the plurality of translations based on the content of the digital content, and selects translations as the dictionary information from the translations which have been determined, based on the user information in the user information storage device.

In accordance with the arrangement, the content translation device translates the digital content, and when a plurality of translations exists as candidates for the same word in the result of translation, the dictionary information selection device determines a presumably most suitable translation from the plurality of translations based on the content of the digital content, and selects translations as dictionary information from the translations which have been determined, based on the user information in the user information storage device.

Furthermore, a digital content creation system according to a seventh aspect of the present invention is a digital content creation system according to one of the third to sixth aspects, including a content layout device that lays out digital content with the dictionary information associated therewith in an output layout which is determined based on the user information in the user information storage device.

In accordance with the arrangement, the content layout device lays out digital content with the dictionary information associated therewith in an output layout which is determined based on the user information in the user information storage device.

The output layout includes a display layout that displays browsing information on the screen, and a print layout that prints the browsing information on paper. Hereinafter, the same applies to a digital content distribution system according to the ninth aspect.

Furthermore, a digital content creation system according to an eighth aspect of the present invention is a digital content creation system according to one of the third to seventh aspects, wherein the user information includes association limit information regarding an upper limit number or a lower limit number for dictionary information to be associated with the digital content, and the dictionary information association device associates the dictionary information selected by the dictionary information selection device with the digital content based on the association limit information in the user information storage device.

In accordance with the arrangement, the dictionary information association device associates the selected dictionary information with the digital content based on the association limit information in the user information storage device.

The association limit information is not limited to setting of an upper limit number or a lower limit number in actual value, and the upper limit number or the lower limit number may be set by ratio, for example, the upper limit ratio to the text information included in the digital content.

Furthermore, a digital content distribution system according to the ninth aspect of the present invention is a system that distributes digital content, including: a user information storage device that stores user information regarding a user; a dictionary information storage device that stores dictionary information; a dictionary information selection device that selects the dictionary information from the dictionary information storage device based on the user information in the user information storage device and the content of digital content associated with the user information; a dictionary information association device that associates the dictionary information selected by the dictionary information selection device with the digital content; a content layout device that lays out the digital content with the dictionary information associated therewith in an output layout which is determined based on the user information in the user information storage device; and a content distribution device that distributes the digital content laid out by the content layout device to the user.

In accordance with the arrangement, the dictionary information selection device selects dictionary information from the dictionary information storage device based on the user information in the user information storage device and the content of digital content associated with the user information, and the dictionary information association device associates the selected dictionary information with the digital content. The content layout device lays out the digital content with the dictionary information associated therewith in an output layout which is determined based on the user information in the user information storage device, and the content distribution device distributes to the user the digital content which has been laid out.

Furthermore, a digital content creation system according to a tenth aspect of the present invention is a digital content distribution system according to the ninth aspect, including: a content storage device that stores a plurality of digital contents; and a content selection device that selects the digital content from the content storage device based on the user information in the user information storage device. The dictionary information selection device selects the dictionary information from the dictionary information storage device based on the user information in the user information storage device and the content of the digital content selected by the content selection device, and the dictionary information association device associates the dictionary information selected by the dictionary information selection device with the digital content selected by the content selection device.

In accordance with the arrangement, the content selection device selects digital content from the content storage device based on the user information in the user information storage device, and the dictionary information selection device selects dictionary information from the dictionary information storage device based on the user information in the user information storage device and the content of the digital content selected by the content selection device. The dictionary information association device associates the selected dictionary information with the selected digital content.

Furthermore, in order to achieve the above objects, a storage medium storing a content distribution program according to an eleventh aspect of the present invention is a computer-readable storage medium that stores a content distribution program for distributing digital content. The storage medium including a user information storage program for storing user information regarding a user; a dictionary information storage program for storing dictionary information; a dictionary information selection program for selecting the dictionary information from the dictionary information storage program based on the user information in the user information storage program and the content of digital content associated with the user information; a dictionary information association program for associating the dictionary information selected by the dictionary information selection program with the digital content; a content layout program for laying out the digital content with the dictionary information associated therewith in an output layout which is determined based on the user information in the user information storage program; and a content distribution program for distributing the digital content laid out by the content layout program to the user.

In accordance with the arrangement, a content distribution program stored on a storage medium is read by a computer, and the computer executes a process according to the program which has been read, thereby enabling an operation equivalent to the digital content distribution system according to the ninth aspect.

BRIEF DESCRIPTION OF THE DRAWINGS

FIG. 3 is a chart showing the data structure of a user profile table 300;

FIG. 5(a) is a schematic showing the data structures of digital content, and FIG. 5(b) is a category No. association table 340;

FIG. 6 is a chart showing the data structure of a dictionary information registration DB 44;

FIG. 9 is a schematic showing a user ID, etc. input screen;

FIG. 10 is a schematic showing a category, etc. specification screen;

DETAILED DESCRIPTION OF PREFERRED EMBODIMENTS

An embodiment of the present invention will be described below with reference to the drawings. FIGS. 1 to 12 are diagrams showing a text information browsing aid system, a digital content creation system, a digital content distribution system, and a storage medium according to the embodiment of the present invention.

Figure 1:
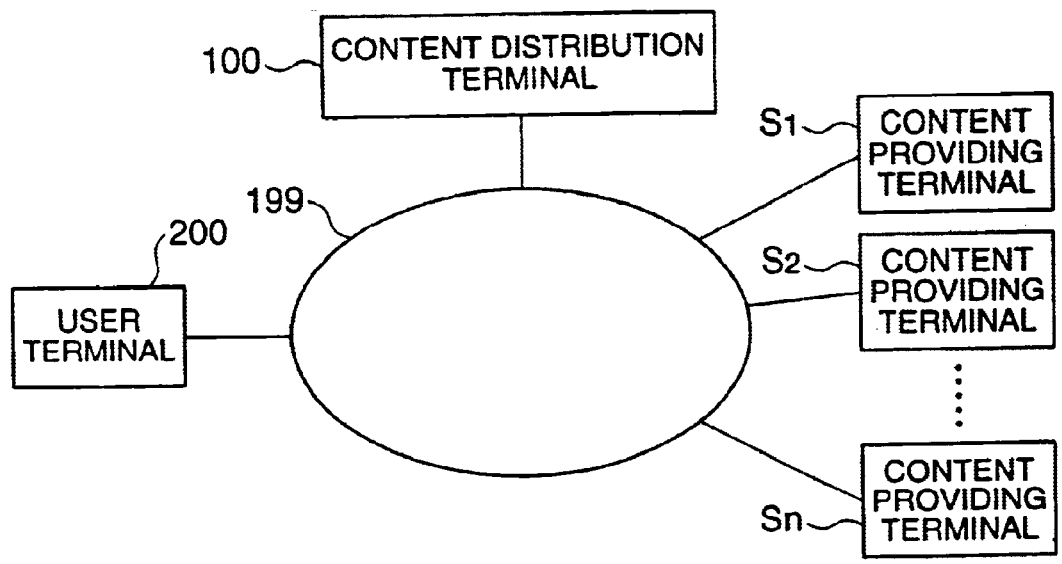
FIG. 1 is a schematic showing the configuration of a network system to which the present invention is applied.

In this embodiment, a text information browsing aid system, a digital content creation system, a digital content distribution system, and a storage medium according to the present invention are applied to a case where a content distribution terminal 100 distributes digital content, such as news to a user terminal 200, as shown in FIG. 1.

First, the configuration of a network system to which the present invention is applied will be described with reference to FIG. 1. FIG. 1 is a schematic showing the network system to which the present invention is applied.

As shown in FIG. 1, a plurality of content providing terminals $S_1$ to $S_n$ which provide digital content, a content distribution terminal 100 which collects, stores, and distributes the digital content provided by the content providing terminals $S_1$ to $S_n$, and a user terminal 200 for the user are connected to the Internet 199. Although only one user termiinal 200 is shown in order to facilitate understanding of the present invention, a plurality of user terminals can actually be connected to the Internet 199.

The content providing terminals $S_1$ to $S_n$ are constructed so as to have the same functionality as an ordinary computer in which a CPU, a ROM, a RAM and an I/F are connected via a bus. When digital content is created, the content providing terminals $S_1$ to $S_n$ add to the digital content a category No. to identify the category of the digital content, and transmit it to the content distribution terminal 100. The category No. will be described below in more detail.

The user terminal 200 is constructed so as to have the same functionality as an ordinary personal computer in which a CPU, ROM, a RAM and an I/F are connected via a bus. The user terminal 200 has a WWW browser, and it accesses the content distribution terminal 100 using the WWW browser.

Figure 2:
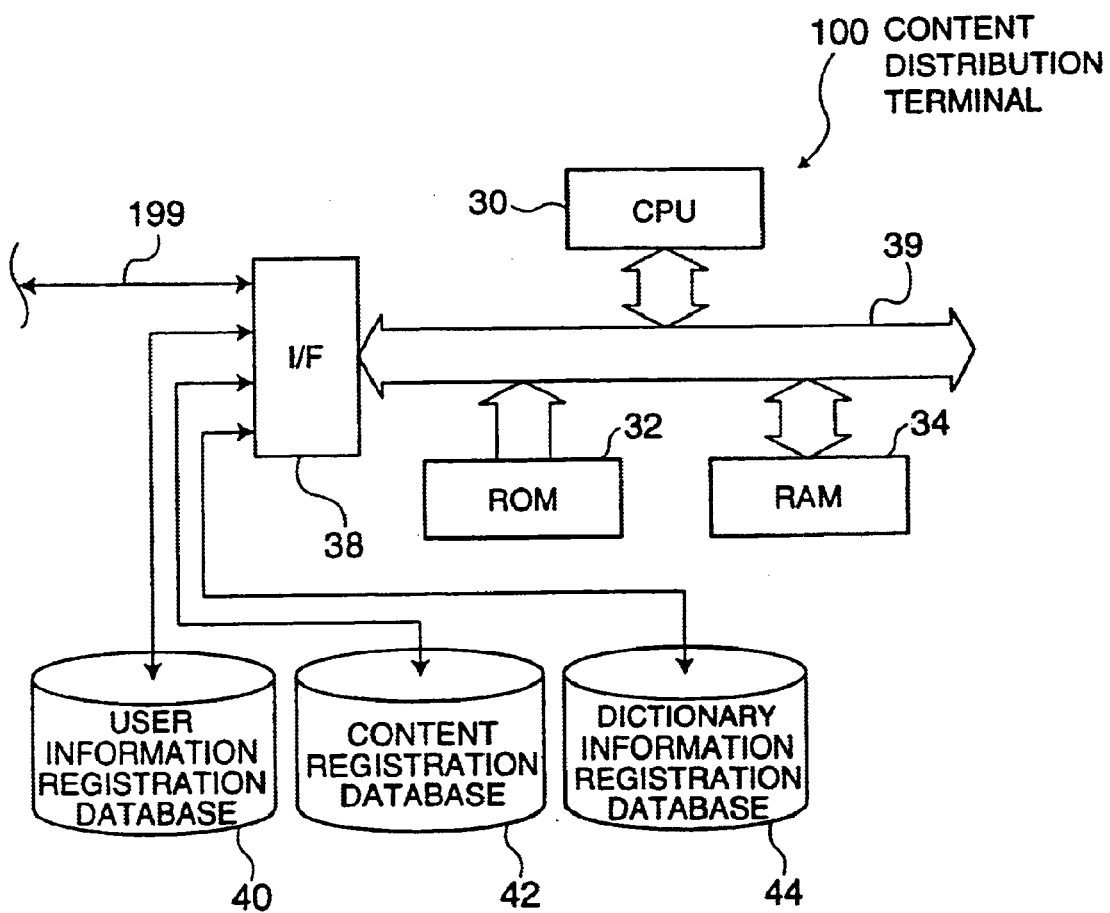
FIG. 2 is a schematic showing the construction of a content distribution terminal 100.
Figure 4:
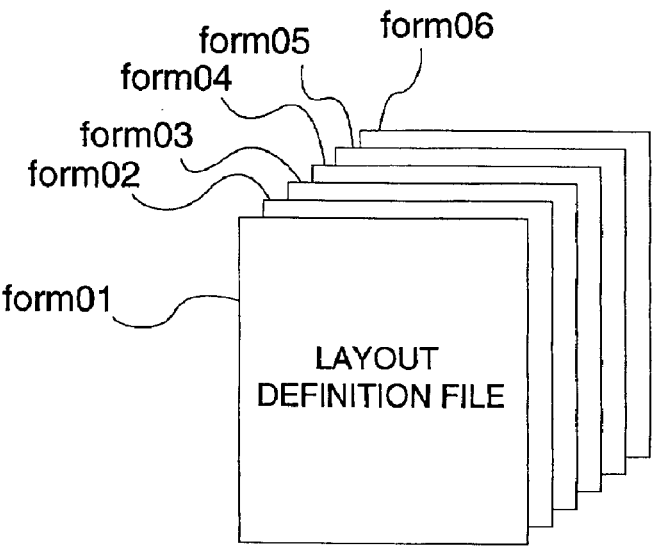
FIG. 4(a) is a schematic showing the data structures of a layout definition file.
FIG. 4(b) is a layout No. association table 330.

Next, the structure of the content distribution terminal 100 will be described in detail with reference to FIG. 2. FIG. 2 is a schematic showing the structure of the content distribution terminal 100.

As shown in FIG. 2, the content distribution terminal 100 includes a CPU 30 which controls operations and the overall system according to a control program, a ROM 32 in a specific area of which the control program for the CPU 30 are stored in advance, a RAM 34 which stores data read from the ROM 32 and operation results required in the course of operations by the CPU 30, and an I/F which intermediates data input and output from and to external apparatuses, being connected to each other so as to allow exchange of data via a bus 39 which is a signal line to transfer data.

A user information registration database (hereinafter abbreviated simply as "DB") 40 in which user information is registered, a content registration DB 42 in which the digital content provided by the content providing terminals $S_1$ to $S_n$ are collected and stored, a dictionary information registration DB 44 in which dictionary information, such as an English-Japanese dictionary, is registered, and a signal line for connection with the Internet 199, are connected to the I/F 38 as the external apparatuses.

The user information registration database 40 stores a user profile table 300 on which user information is registered, as shown in FIG. 3. FIG. 3 is a chart showing the data structure of the user profile table 300.

As shown in FIG. 3, the user profile table 300 allows registration of a single record or a plurality of records for each user. Each record includes a field 302 in which a user ID for identifying a user is registered, a field 304 in which a destination address of digital content is registered, a field 306 in which a category No. is registered, a field 308 in which a keyword is registered, a field 310 in which a distribution date is registered, a field 312 in which a distribution time is registered, a field 314 in which a layout No. is registered, a field 316 in which a maximum number of pages is registered, a field 318 in which a font size is registered, a field 319 in which fields of the user's interest are registered, a field 320 in which the linguistic level of the user is registered, a field 322 in which the expertise level of the user is registered, and a field 324 in which languages for which the user desires translation are registered.

In the field 308, when digital content, including a keyword specified by the user, is to be selected for distribution, the keyword is registered. The keyword is, for example, one which presumably appears frequently in articles of a category of the user's interest. In the example shown in FIG. 3, in the first to the third rows of the field 308, "processor", "OS", and "application" are registered, respectively.

In the field 310, a distribution date on which the user desires the digital content to be distributed is registered. The distribution date is specified as, for example, "every day" if the digital content is desired to be distributed every day, "weekdays" if the digital content is desired to be distributed only on weekdays, and "weekend" if the digital content is desired to be distributed only on weekend. In the example shown in FIG. 3, in the first to the third rows of the field 310, "every day", "weekdays", and "weekend" are registered, respectively.

In the field 312, a distribution time of the specified distribution date on which the user desires the digital content to be distributed is registered. The distribution date is specified, for example, as one of 0 o'clock to 23 o'clock in the 24-hour representation. In the example shown in FIG. 3, in the first to the third rows of the field 312, "5 o'clock", "11 o'clock", and "9 o'clock" are registered, respectively.

In the field 314, a layout No. that specifies the output layout of digital content is registered. As the layout No., for example, a layout No. identifying an output layout desired by the user is specified. In the example shown in FIG. 3, in the first to the third rows of the field 314, "layout No. 2", "layout No. 5", and "layout No. 6" are respectively registered. The layout No. will be described below in more detail.

In the field 316, a maximum number of pages of a display or a print of digital content is registered. As the maximum number of pages, for example, an upper limit of the number of pages may be specified, or absence of the upper limit may be specified by an indication of "u". In the example shown in FIG. 3, in the first to the third rows of the field 316, "two pages", "two pages", and "u" are registered, respectively.

In the field 318, a font size with which digital content is displayed or printed is registered. In the example shown in FIG. 3, in the first to the third rows of the field 318, "small", "small", and "regular" are registered, respectively.

In the field 319, fields of the user's interest are registered. In the example shown in FIG. 3, in the first to the third rows of the field 319, "computer and sports", "securities", and "medicine" are registered, respectively. As will be described below in more detail, the fields of interest registered in the field 319 are used as an index to select particular dictionary information from the dictionary information registration DB 44, and the fields may overlap with or differ from the category registered in the field 306. For example, a user interested in the field of computer may wish to receive distribution of digital content in the field of sports as well as in the field of computer. In that case, category Nos. associated with the field of sports and the field of computer are registered in the field 306, and the field of computer is registered in the field 319.

In the field 320, the linguistic level of the user is registered. For example, the user is given a test based on criteria employed in a predetermined language proficiency certification test, and the test score of the user is set as the linguistic level. In the example shown in FIG. 3, in the first to the third rows of the field 320, "720", "420", and "700" are registered, respectively. In this case, a greater value indicates a higher linguistic level.

In the field 322, the expertise level of the user is registered. For example, the user is given a test based on criteria employed in a predetermined expertise certification test and a qualification test, and the test score of the user is set as the expertise level. In the example shown in FIG. 3, in the second row of the field 322, "securities: rank A" is registered. This indicates an expertise level of A rank in the field of securities, the expertise level being higher in the alphabetically descending order.

In the field 324, languages for which the user desires translation are registered. In the example shown in FIG. 3, in the first to the third rows of the field 324, "English", "English and French", and "Chinese" are registered, respectively.

The user information registration database DB 40 also stores a plurality of layout definition files form01 to form06 defining output layouts of digital content, and a layout No. association table 330 showing an association between the layout definition files form01 to form06 and layout Nos. as shown in FIGS. 4(a) and 4(b). FIG. 4(a) is a schematic showing the data structures of the layout definition files, and FIG. 4(b) shows the layout No. association table 330.

As shown in FIG. 4(a), the layout definition files form01 to form06 define, for example, the size and location in the print area on paper of a text information frame that stores text information and images included in digital content, the font size, type, and color of the text information, character spacing and line pitch, and the number, quality, size, and ratio of the images, and are described, for example, in XML (eXtensible Markup Language).

In the layout No. association table 330, one record is registered for each layout No., as shown in FIG. 4(b). Each record includes a field 332 in which a layout No. is registered, and a field 334 in which the file name of layout definition file is registered. In the example shown in FIG. 4(b), in the record on the first row, "1" is registered as the layout definition No. and "form01" is registered as the name of layout definition file, respectively.

The content registration DB 42 stores digital content provided by the content providing terminals $S_1$ to Sn, and a category association table 340 showing an association between main categories and subcategories and category Nos. FIG. 5(a) is a schematic showing the data structures of the digital content, and FIG. 5(b) is a schematic showing the category No. association table 340.

As shown in FIG. 5(a), a category No. is assigned to the digital content provided by the content providing terminals $S_1$ to $S_n$, so that the content distribution terminal 100 classifies the digital content by category based on the category No. and registers the digital content in the content registration DB 42. The digital content is registered with, in addition to the category No., a main category and a subcategory assigned thereto with reference to the category No. association table 340.

In the category No. association table 340, one record is registered for each main category and subcategory, as shown in FIG. 5(b). Each record includes a field 342 in which a category No. is registered, a field 344 in which a main category is registered, and a field 346 in which a subcategory is registered. In the example shown in FIG. 5(b), in the record on the first row, "1102" is registered as the category No., "world news" is registered as the main category, and "America" is registered as the subcategory, respectively.

The dictionary information registration DB 44 stores an English-Japanese dictionary registration table 360 in which an English-Japanese dictionary is registered. FIG. 6 is a table showing the data structure of the dictionary information registration DB 44.

In the English-Japanese dictionary registration table 360, one record is registered for each English word, as shown in FIG. 6. Each record includes a field 362 in which an English word is registered, a field 364 in which translations of the English word in the field 362 are registered, and a field 366 in which a linguistic level presumably required for translation of the English word in the field 362 is registered, and a field 368 in which an expertise level presumably required to understand the English word in the field 362 is registered. In the example shown in FIG. 6, in the record on the first row, "company" is registered as the English word, "kaisha, shousha, and shoukai" are registered as the translations, "400" is registered as the linguistic level, and "general" is registered as the expertise level, respectively.

Although not shown, the dictionary information registration DB 44 additionally includes a technical term dictionary registration table in which a technical term dictionary of a technical field, such as computer, is registered, an exposition dictionary registration table in which an exposition dictionary is registered, a synonym dictionary registration table in which a synonym dictionary is registered, an antonym dictionary registration table in which an antonym dictionary is registered, and a related term dictionary registration table in which a related term dictionary is registered. In the related term dictionary, for example, news concerning "I Love You virus" is registered as dictionary information for the word "virus".

Next, the structure of the CPU 30 and processes executed by the CPU 30 will be described with reference to FIGS. 7 and 8.

Figure 7:
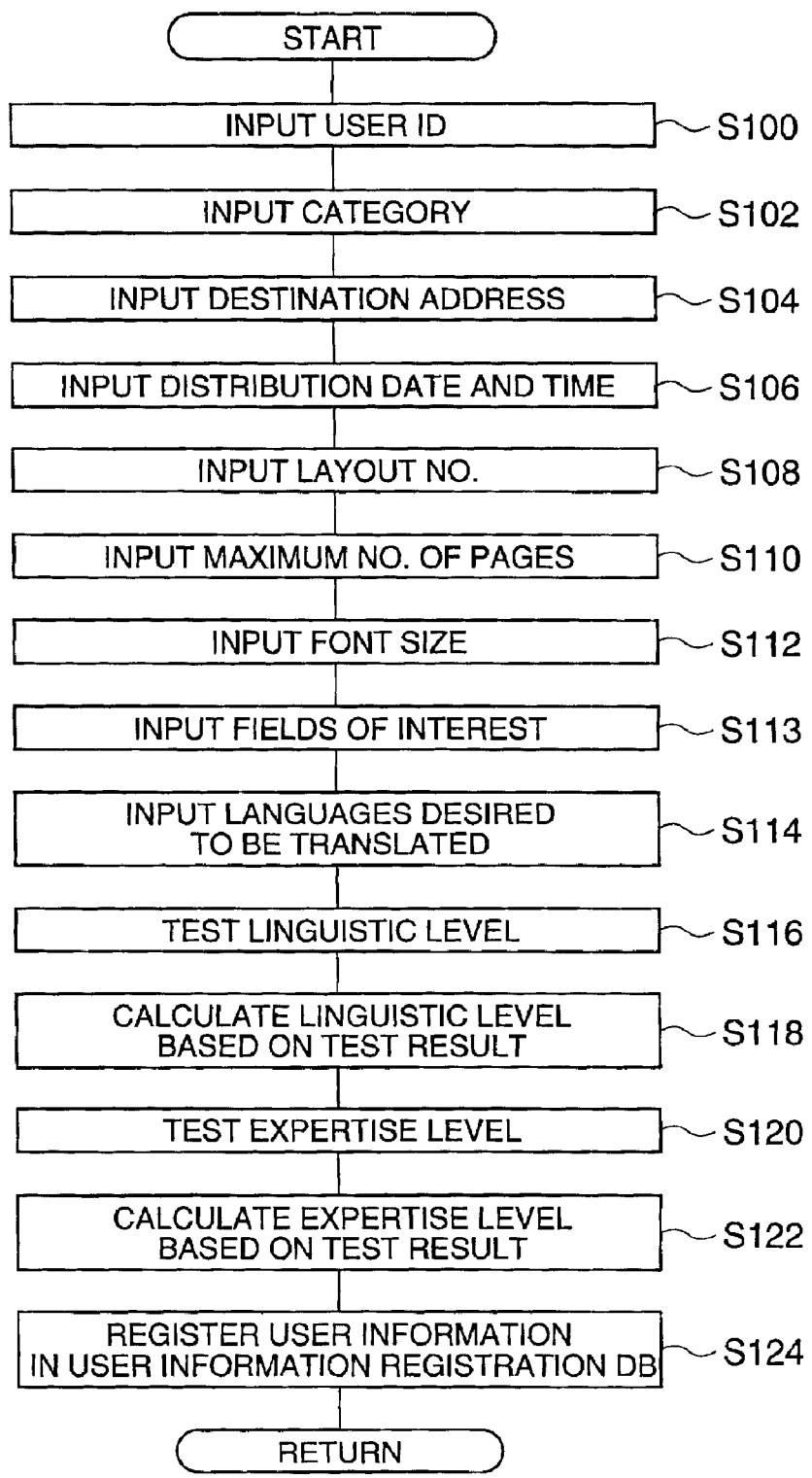
FIG. 7 is a flowchart showing a user registration process.
Figure 8:
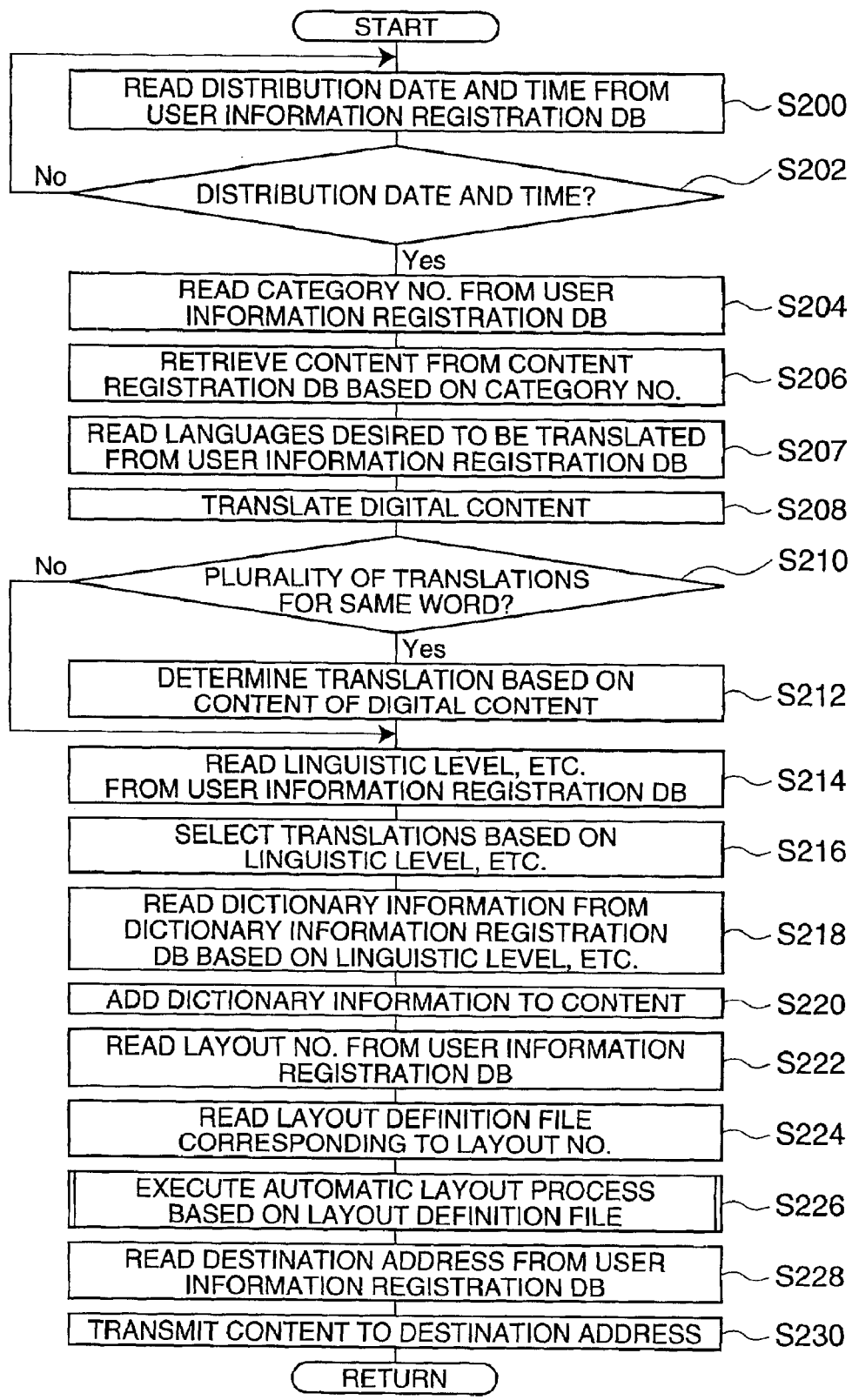
FIG. 8 is a flowchart showing a content distribution process.

The CPU includes, for example, a microprocessing unit MPU, and it activates a predetermined program stored in a predetermined area of the ROM 32 and executes the user registration process and the content distribution process shown in the flowcharts of FIGS. 7 and 8, respectively, according to the program by time division.

First, the user registration process will be described in detail with reference to FIG. 7. FIG. 7 is a flowchart showing the user registration process.

In the user registration process, a user which has accessed is requested to input necessary user information including a user ID, and the user information which has been input is registered in the user profile table 300. When the user registration process is executed by the CPU 30, first, the process enters step S100, as shown in FIG. 7. The inputs in subsequent steps will be made by interactive communications with the user.

In step S100, a user ID is input. The process proceeds to step S102, in which a main category and a subcategory are input The process proceeds to step S104, in which a destination address is input. The process proceeds to step S106, in which a distribution date and a distribution time are input.

The process then proceeds to step S108.

In step S108, a layout No. is input. The process proceeds to step S110, in which a maximum number of pages is input. The process proceeds to step S112, in which a font size is input. The process then proceeds to step S113.

In step S113, fields of interest are input. The process proceeds to step S14, in which languages desired to be translated are input. The process proceeds to step S116, in which the linguistic level of the user is tested based on criteria employed in a predetermined language proficiency certification test. The process proceeds to step S118, in which the linguistic level of the user is calculated based on the score of the test. The process then proceeds to step S120.

In step S120, the expertise level of the user is tested based on criteria employed in a predetermined expertise certification test or a qualification test. The process proceeds to step S122, in which the expertise level of the user is calculated based on the score of the test. The process then proceeds to step S124.

In step S124, the user information which has been input in steps S100 to S114, S118, and S122 is registered in the user profile table 300. The process then exits the series of processes, returning to the previous process.

Next, the content distribution process will be described in detail with reference to FIG. 8. FIG. 8 is a flowchart showing the content distribution process.

In the content distribution process, digital content is distributed to the user terminal 200 with reference to the user profile table 300. When the content distribution process is executed by the CPU 30, initially, as shown in FIG. 8, the process enters step S200. The processes in the subsequent steps deal with one record in the user profile table 300. The processes in the subsequent steps are actually executed for the number of the records registered in the user profile table 300.

In step S200, the distribution date and the distribution time are read from the user profile table 300. The process proceeds to step S202, in which it is determined whether the date and time when the digital content is to be distributed have been reached based on the distribution date and the distribution time which have been read. If it is determined that the date and time when the digital content is to be distributed have been reached (Yes), the process proceeds to step S204, whereas otherwise (No), the process proceeds to step S200.

In step S204, the category No. is read from the user profile table 300. The process proceeds to step S206, in which the digital content in the content registration DB 42 is searched based on the category No. which has been read, whereby digital content with a matching category No. assigned thereto is retrieved. The process proceeds to step S207, in which the languages desired to be translated are read from the user profile table 300. The process then proceeds to step S208.

In step S208, of the text information included in the digital content which has been retrieved, read-out words and sentences in the languages desired to be translated are translated into a predetermined language (e.g., Japanese) by using the dictionary information in the dictionary information registration DB 44. The process proceeds to step S210, in which it is determined whether a plurality of candidate translations exists for the same word. If it is determined that a plurality of candidate translations exists (Yes), the process proceeds to step S212.

In step S212, based on the content of the text information included in the digital content which has been retrieved (e.g., context and translations preceding and following the word for which a plurality of candidate translations exists), a most suitable translation is determined from the plurality of translations. The process proceeds to step S214, in which the fields of interest, the linguistic level, and the expertise level are read from the user profile table 300. The process then proceeds to step S216.

In step S216, based on the fields of interest, the linguistic level, and the expertise level which have been read, translations are selected from the results of the translation in step S208 or the translations determined in step S212. More specifically, translations which match the read-out fields of interest are selected from the results of the translation in step S208 or the translations determined in step S212. Then, the linguistic levels and the expertise levels associated with the selected translation are read from the dictionary information registration DB 44, and the linguistic levels and the expertise levels associated with the translations are respectively compared with the linguistic level and the expertise level of the user. If it is found, as a result of the comparison, that the linguistic level associated with a translation is higher than the linguistic level of the user or the expertise level associated with the translation is higher than the expertise level of the user, the translation is selected as dictionary information to be added to the digital content.

The process then proceeds to step S218, in which dictionary information is read from the dictionary information registration DB 44 based on the fields of interest, the linguistic level, and the expertise level which have been read, and the content of the text information included in the digital content which has been retrieved. More specifically, first, in step S206, words are extracted from the text information included in the digital content retrieved in step S206, and words which match the fields of interest which has been read are selected from the extracted words. Then, the linguistic levels and the expertise levels associated with the selected words are read from the dictionary information registration DB 44, and the linguistic levels and the expertise levels associated with the words are respectively compared with the linguistic level and the expertise level of the user. If it is found, as a result of the comparison, that the linguistic level associated with a word is higher than the linguistic level of the user or the expertise level associated with the word is higher than the expertise level of the user, dictionary information associated with the word is read from the dictionary information registration DB 44.

Then, the process proceeds to step S220, in which the dictionary information selected in steps S216 and S218 is added to the digital content. The process proceeds to step S222, in which the layout No. is read from the user profile table 300. The process proceeds to step S224, in which the layout definition file associated with the layout No. which has been read is read from the user information registration DB 40 with reference to the layout No. association table 330. The process proceeds to step S226, in which an automatic layout process is executed to lay out the digital content in an output layout determined based on the layout definition file which has been read. The process then proceeds to step S228.

In step S228, the destination address is read from the user profile table 300. The process proceeds to step S230, in which the digital content which has been created is distributed to the destination address which has been read. The process then exits the series of processes and returns to the previous process.

If it is determined in step S210 that a plurality of candidate translations does not exist for the same word (No), the process proceeds to step S214.

Next, the operation of the embodiment will be described with reference to FIGS. 9 to 12.

First, registration of information required for distribution of digital content will be described.

When the user desires distribution of digital content, the user accesses the content distribution terminal 100 using a WWW browser on the user terminal 200, and inputs a user registration request.

When the user registration request is input, the user terminal 200 receives screen constitution data which constitutes a user ID, etc. input screen to input a user ID, etc. by a communication with the content distribution terminal 100, and displays a screen as shown in FIG. 9 based on the screen constitution data. FIG. 9 is a schematic showing the user ID, etc. input screen.

As shown in FIG. 9, the user inputs a user ID, a password, and a destination address by inputting values, text strings in text boxes 530 to 532, respectively. When the input of the user ID, etc. is complete, the user clicks an "OK" button 526.

When the input of the user ID, etc. is complete, the user terminal 200 transmits the user ID, etc. to the content distribution terminal 100. Then, a screen as shown in FIG. 10 is displayed by a communication with the content distribution terminal 100. FIG. 10 is a schematic showing a category, etc. specification screen.

As shown in FIG. 10, the user is allowed to specify up to six categories of digital content for which the user desires distribution. The categories of digital content are specified, for example, by selecting desired categories in combo boxes 520 to 525 in which a list of categories is registered.

The user also inputs a distribution date and a distribution time on which the user desires distribution. The distribution date is input, for example, by selecting one of option buttons 540 to 543 for "every day", "every week", "weekdays (from Monday through Friday)", and "on weekend (Saturday and Sunday)". The distribution time is input, for example, by selecting a desired distribution time in combo boxes 550 and 551 in which a list of distribution times is registered. When the inputs are complete, the user clicks an "OK" button 552.

Figure 11:
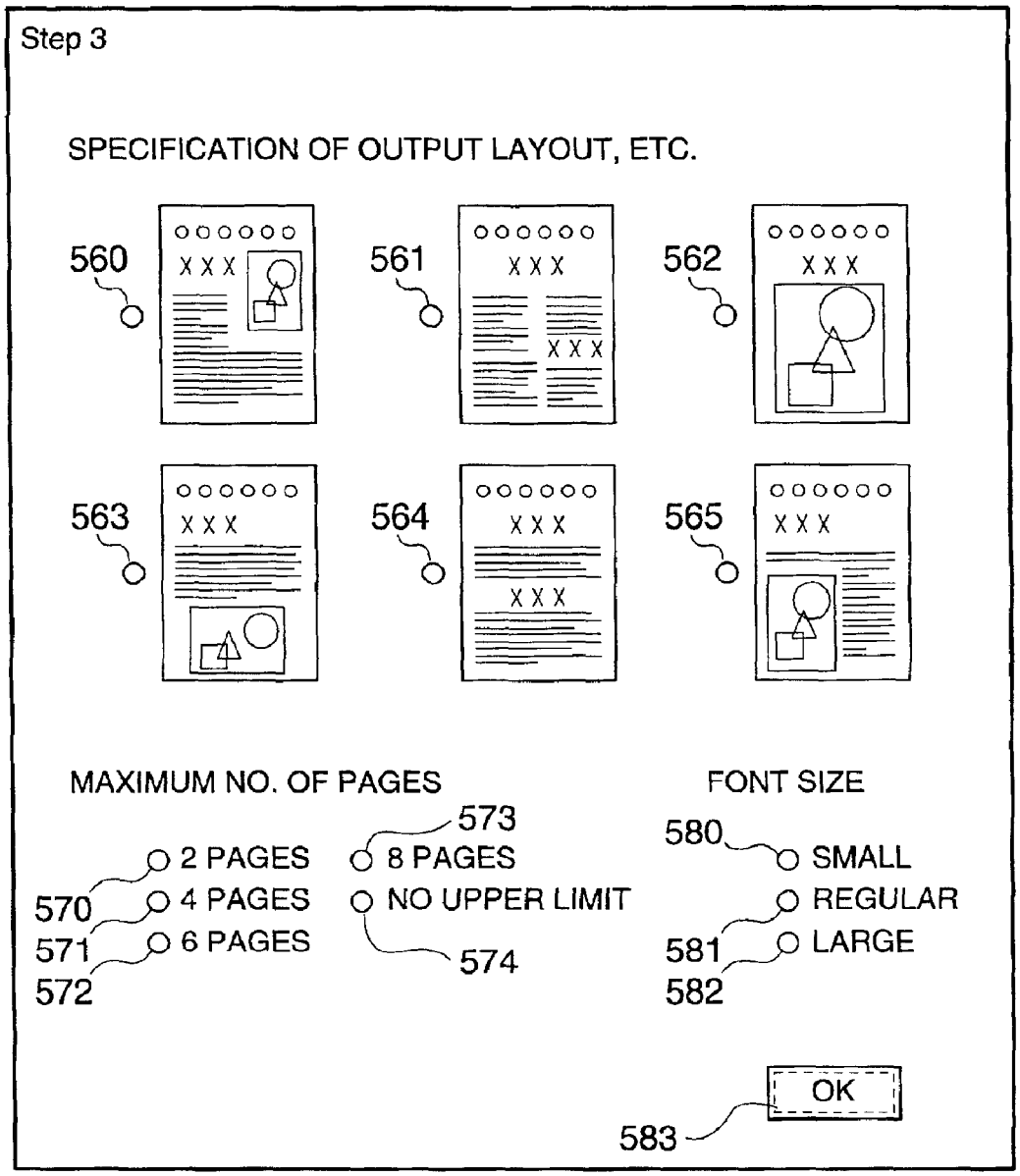
FIG. 11 is a schematic showing an output layout, etc. specification screen.

When the specification of the categories is complete, the user terminal 200 transmits the specification of the categories to the content distribution terminal 100. Then, a screen as shown in FIG. 11 is displayed by a communication with the content distribution terminal 100. FIG. 11 is a schematic showing an output layout, etc. specification screen.

As shown in FIG. 11, the user specifies the layout No., the maximum number of pages, and the font size. The layout No. is specified, for example, by selecting one of the six option buttons 560 to 565 respectively corresponding to sample images laid out according to each of the output layouts. The maximum number of pages is specified, for example, by selecting one of the option buttons 570 to 574 for "two pages", "four pages", "six pages", "eight pages", and "no upper limit". The font size is specified, for example, by selecting one of the option buttons 580 to 582 for "small", "regular", and "large". When the specifications are complete, the user clicks an "OK" button 583.

When the specifications of the output layout, etc. is complete, the user terminal 200 transmits the specifications of the output layout, etc. to the content distribution terminal 100. Then, although not shown, a user knowledge information input screen to input the user's knowledge information is displayed by a cammunication with the content distribution terminal 100.

The user inputs fields of interest and languages desired to be translated in the same manner as shown in FIGS. 9 to 11, and takes predetermined tests with respect to the linguistic level and the expertise level. The linguistic level and the expertise level of the user are calculated by the predetermined tests being taken by the user.

Figure 12:
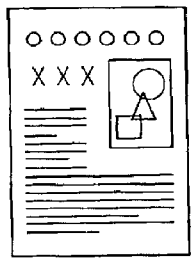
FIG. 12 is a schematic of a registration content confirmation screen.

When the input of the user's knowledge information is complete, the user terminal 200 transmits the knowledge information to the content distribution terminal 100. Then, a screen as shown in FIG. 12 is displayed by a communication with the content distribution terminal 100. FIG. 12 is a schematic showing a registration information confirmation screen.

In the example shown in FIG. 12, the specification of the categories is displayed as "sports; golf; Maruyama", and "America; American top news; Bush". If the registration information is correct, the user clicks a "distribution start" button 590.

When the confirmation of the registration information is complete, the user terminal 200 transmits a distribution start request to the content distribution terminal 100.

Upon receiving the distribution start request, in steps S100 to S114, the content distribution terminal 100 registers the specification of content, the user ID, etc., and the specifications of output layout, etc. which have been received in the user profile table 300. The specification of content is registered in terms of a content No. with reference to the content No. association table 340, and the specification of output layout is registered in terms of a layout No. with reference to the layout No. association table 330.

Next, distribution of digital content with reference to the user profile table 300 will be described.

When the date and time for distribution of digital content with reference to the user profile table 300 have been reached, in steps S204 to S212, the content distribution terminal 100 reads the category No. from the user profile table 300, performs a search based on the category No. which has been read, and retrieves the digital content to which a category No. matching the category No. is assigned. Then, the languages desired to be translated are read from the user profile table 300, and words and sentences in the languages to be translated in the text information included in the digital content which has been retrieved are translated, for example, into Japanese. If a plurality of candidate translations exists for the same word in the translation result, a presumably most suitable translation is determined from the plurality of candidate translations based on the content of the text information included in the digital content which has been retrieved.

Then, in steps S214 and S216, the fields of interest, the linguistic level, and the expertise level are read from the user profile table 300, and translations are selected from the translation result based on the fields of interest, the linguistic level, and the expertise level which have been read. With regard to the selection of translations, first, translations which match the read-out fields of interest are selected, and the linguistic levels and the expertise levels associated with the selected translations are read from the dictionary information registration DB 44. Then, if the linguistic level associated with a translation is higher than the linguistic level of the user or the expertise level associated with the translation is higher than the expertise level of the user, the translation is selected as dictionary information.

Then, in step S218, the dictionary information is read from the dictionary information registration DB 44 based on the fields of interest, the linguistic level, and the expertise level which have been read and the content of the text information included in the digital content which has been retrieved. With regard to the reading of the dictionary information, first, words are extracted from the text information included in the digital content, words which match the fields of interest are selected from the extracted words, and the linguistic levels and the expertise levels associated with the selected words are read from the dictionary information registration DB 44. If the linguistic level associated with a word is higher than the linguistic level of the user or the expertise level associated with the word is higher than the expertise level of the user, dictionary information associated with the word is read from the dictionary information registration DB 44.

Then, in steps S220 to S226, the selected dictionary information is added to the digital content, the layout No. is read from the user profile table 300, and the layout definition file corresponding to the layout No. which has been read is read from the user information registration DB 40 with reference to the layout No. association table 330. Then, the digital content is laid out according to the output layout determined based on the layout definition file which has been read.

Then, in steps S228 and S230, the destination address is read from the user profile table 300, and the digital content which has been created is distributed to the destination address which has been read.

As described above, in this embodiment, the content distribution terminal 100 includes the user information registration DB 40 that stores user information and the dictionary information registration DB 44 storing dictionary information, so that dictionary information is selected from the dictionary information registration DB 44 based on the user information in the user information registration DB 40 and the content of digital content associated with the user information and the selected dictionary information is added to the digital content.

Thus, dictionary information within the knowledge level of the user is not added, while dictionary information beyond the knowledge level of the user is added to the digital content, so that the user can obtain digital content including only dictionary information of a relatively high necessity. Accordingly, the user is provided with more readable digital content compared with before.

Furthermore, in this embodiment, the content distribution terminal 100 selects dictionary information which matches the user's interest or preference from the dictionary information registration DB 44 based on the fields of interest in the user information registration DB 40.

Thus, dictionary information which does not match the user's interest or preference is not added, while dictionary information which matches the user's interest or preference is added to the digital content, so that the user can obtain digital content including only dictionary information of a relatively high necessity. Accordingly, the user is provided with even more readable digital content.

Furthermore, in this embodiment, the content distribution terminal 100 selects dictionary information associated with words pr sentences included in the digital content from the dictionary information registration DB 44 based on the user information in the user information registration DB 40.

Thus, dictionary information associated with the words or sentences included in the digital content are added to the digital content, so that the user can obtain digital contents including relatively useful dictionary information. Accordingly, the user is provided with even more readable digital content.

Furthermore, in this embodiment, the content distribution terminal 100 translates text information included in the digital content. If a plurality of candidate translations exits for the same word in the translation result, the content distribution terminal 100 determines a presumably most suitable translation from the plurality of candidate translations based on the content of the digital content, and, based on the user information in the user information registration DB 40, selects translations as dictionary information from the translations which have been determined.

Thus, the user can obtain digital content including relatively accurate translations. Accordingly, the user is provided with even more readable digital content.

Furthermore, in this embodiment, the content distribution terminal 100 determines the output layout of the digital content based on the user information in the user information registration DB 40 so as to perform the layout.

Thus, the user information is taken into consideration concerning the output layout, so that the digital content is output in an output layout relatively desirable for the user. Accordingly, the digital content is output in an output layout more viewable for the user compared with before.

In particular, in this embodiment, a print layout is determined, and, for example, in the case of printing on paper, the printing will be performed on a page-by-page basis. Thus, by using a layout in which the content is closed on a page-by-page basis, it is possible to view the pages on the screen one by one and to print only desired pages. Furthermore, with a layout in which date is inserted on each page, when the digital content is stored as a file, the user enjoys the convenience of knowing when the article was made from the date.

Furthermore, in this embodiment, the content distribution terminal 100 includes the content registration DB 42 that stores a plurality of digital contents, reads the content No. and the associated layout definition file from the user information registration DB 40, selects digital content from the content registration DB 42 based on the content No. which has been read, and lays out the selected digital content according to an output layout determined based on the layout definition file which has been read.

Thus, only digital content relatively desirable for the user is laid out, reducing difficulty in viewing due to undesired and unnecessary digital content being included together. Accordingly, the digital content is output in an output layout viewable for the user.

What is claimed is:

1. A system for creating digital content, comprising:
    a user information storage device that stores user information regarding a user;
    a dictionary information storage device that stores dictionary information;
    a dictionary information selection device that selects the dictionary information from the dictionary information storage device based on the user information in the user information storage device and the content of digital content associated with the user information; and
    a dictionary information association device that associates the dictionary information selected by the dictionary information selection device with the digital content.

2. The system according to claim 1, the user information including interest information regarding the interest or preference of the user,
    and the dictionary information selection device selecting dictionary information which matches the interest or preference of the user from the dictionary information storage device based on the interest information in the user information storage device.

3. The system according to claim 1, the dictionary information selection device selecting dictionary information related to words or sentences included in the digital content from the dictionary information storage device based on the user information in the user information storage device.

4. The system according to claim 1, further including a content translation device that translates the text information included in the digital content, such that, when a plurality of translations exists as candidates for the same word in the result of translation by the content translation device, the dictionary information selection device determines a presumably most suitable translation from the plurality of translations based on the content of the digital content, and selects translations as the dictionary information from the translations which have been determined.

5. The system according to claim 1, further including a content layout device that lays out digital content with the dictionary information associated therewith in an output layout which is determined based on the user information in the user information storage device.

6. The system according to claim 1, the user information including association limit information regarding an upper limit number or a lower limit number for dictionary information to be associated with the digital content, and the dictionary information association device associating the dictionary information selected by the dictionary information selection device with the digital content based on the association limit information in the user information storage device.

* * * * *